United States Patent
Buxton et al.

(10) Patent No.: US 7,903,393 B2
(45) Date of Patent: Mar. 8, 2011

(54) LOCKABLE SHUTTER FOR WITHDRAWABLE RACKS OF LOW-VOLTAGE POWER CIRCUIT BREAKERS

(75) Inventors: Clifford A. Buxton, Bellefontaine, OH (US); Stefan Losch, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 1070 days.

(21) Appl. No.: 10/571,694

(22) PCT Filed: Aug. 18, 2004

(86) PCT No.: PCT/DE2004/001861
§ 371 (c)(1),
(2), (4) Date: Feb. 2, 2007

(87) PCT Pub. No.: WO2005/027288
PCT Pub. Date: Mar. 24, 2005

(65) Prior Publication Data
US 2009/0000926 A1    Jan. 1, 2009

(30) Foreign Application Priority Data

Sep. 11, 2003 (DE) ................................ 103 42 596

(51) Int. Cl.
*H02B 11/12* (2006.01)
(52) U.S. Cl. ...................... 361/608; 200/50.21; 361/673; 439/140
(58) Field of Classification Search ............ 200/50.22
See application file for complete search history.

(56) References Cited

U.S. PATENT DOCUMENTS

| | | | |
|---|---|---|---|
| 3,920,939 A | 11/1975 | Ciboldi et al. | |
| 4,773,870 A | 9/1988 | Sinnig | |
| 5,343,355 A * | 8/1994 | Ishikawa | 361/617 |
| 5,486,978 A * | 1/1996 | Fishovitz | 361/617 |
| 7,440,259 B1 * | 10/2008 | Deylitz et al. | 361/617 |
| 2004/0129545 A1 | 7/2004 | Deylitz et al. | |
| 2009/0128999 A1 * | 5/2009 | Deylitz et al. | 361/617 |

FOREIGN PATENT DOCUMENTS

| | | |
|---|---|---|
| CH | 530 100 | 12/1972 |
| CH | 588 778 A | 6/1977 |
| DE | 2 416 274 | 10/1974 |
| DE | 30 14 557 A | 10/1981 |
| DE | 35 44 667 A1 | 6/1987 |
| DE | 101 20 749 C1 | 7/2002 |
| DE | 101 20 750 C1 | 7/2002 |
| EP | 0 577 111 A | 1/1994 |
| EP | 0 803 140 B1 | 7/1999 |
| GB | 236498 | 7/1925 |

OTHER PUBLICATIONS

Int'l Search Report dated Jan. 24, 2005.

* cited by examiner

*Primary Examiner* — Renee Luebke
*Assistant Examiner* — Lheiren Mae A Caroc
(74) *Attorney, Agent, or Firm* — Harness, Dickey & Pierce, P.L.C.

(57) ABSTRACT

Withdrawable racks for power circuit breakers should be reliably switched. To this end, the movement of the plates of a shutter in the withdrawable rack can be blocked so that the shutter is not permitted to open unintentionally. In a special embodiment, the opening mechanism for the plates can have two V-shaped linkages that are connected to a telescopic rod. The telescopic rod can be locked by a locking element so that the shutter plates, which can be moved by sliders, can no longer be displaced.

19 Claims, 6 Drawing Sheets

LOCKABLE SHUTTER FOR WITHDRAWABLE RACKS OF LOW-VOLTAGE POWER CIRCUIT BREAKERS

This application is the national phase under 35 U.S.C. §371 of PCT International Application No. PCT/DE2004/001861 which has an International filing date of Aug. 18, 2004, which designated the United States of America and which claims priority on German Patent Application number 103 42 596.9 filed Sep. 11, 2003, the entire contents of which are hereby incorporated herein by reference.

FIELD

The present invention generally relates to a closure apparatus or a shutter for withdrawable insert frames for withdrawable circuit breakers. For example, it may relate to one having a plate arrangement which has at least two plates which are arranged parallel, can be moved with respect to one another and each have at least one opening, with the at least one opening in a first plate of the at least two plates being covered, in a closed state, by a second of the at least two plates, and with the at least one opening in each of the two plates being located one above the other in an open state, and having a movement device for movement of the at least two plates relative to one another. Furthermore, the present invention generally relates to a method for protecting a withdrawable insert frame against unauthorized insertion of a circuit breaker, and/or to a method for insertion of a circuit breaker into a withdrawable insert frame.

BACKGROUND

In the case of withdrawable circuit breakers which are fitted to withdrawable insert systems, there is frequently a need to protect the contacts in the withdrawable insert system from being touched accidentally. So-called shutters are used as closure apparatuses for this purpose, as is known. These shutters essentially include plates with openings which can move with respect to one another. In the closed position, the openings in a plate are covered by another plate, so that the contacts of the withdrawable insert system are not accessible. In the open state, the openings in the plates are located one above the other, so that the contacts of the withdrawable insert system are accessible for the withdrawable circuit breaker.

The plates are composed of either an insulating material or of metal. Withdrawable insert systems such as these are known from the documents DE 101 20 749 C1, DE 101 20 750 C1 and EP 0 803 140 B1.

Furthermore, the document GB 236 498 discloses a safety device for electrical switches, in which two plates can be moved with respect to one another so as to create an open position and a closed position. A specific movement device is used for movement.

The document EP 0 577 111 A2 also describes a closure apparatus for withdrawable circuit breakers. The closure apparatus can be locked in its closed position via a lock.

Furthermore, the document DE 2 416 274 A1 discloses a protection apparatus for electrical switch panels, which has a supporting device for panels which can be moved into the depth of the switchgear assembly.

Finally, the document CH 530 100 discloses a closure apparatus with three plates. Furthermore, rods on the movement device project so far forwards that two plates are first of all pushed outwards during insertion of the withdrawable circuit breaker, before the entire closure apparatus is moved towards the contacts.

Furthermore, the applicant is internally aware of withdrawable insert systems in which, during insertion of a withdrawable circuit breaker, the plates first of all move in lateral directions in order to create openings which are somewhat larger than the contact blades which are fitted in the withdrawable insert frame. The complete shutter then moves, in a corresponding manner to the movement direction of the withdrawable circuit breaker, in the direction of the switchgear assembly and is pushed over the contact blades, which are now free and can be made contact with by the laminate blocks of the switches. This movement is controlled, for example, by way of an appropriate mechanism in the insertion drive, or by mechanisms on the withdrawable insert frame.

SUMMARY

An object of at least one embodiment of the present invention is to design withdrawable insert frames for withdrawable circuit breakers and the like that are safer.

According to at least one embodiment of the invention, an object may be achieved by a closure apparatus for withdrawable insert frames for withdrawable circuit breakers, having a plate arrangement which has at least two plates which are arranged parallel, can be moved with respect to one another and each have at least one opening, with the at least one opening in a first plate of the at least two plates being covered, in a closed state, by a second of the at least two plates, and with the at least one opening in each of the two plates being located one above the other in an open state, and having a movement device for movement of the at least two plates relative to one another, in which case the movement device can be blocked such that the plates of the plate arrangement cannot be moved to the open state, and in which the movement device has pivoting elements which can each pivot about an axis parallel to the plates, engage in one another in a blocking state, and thus block the movement device.

At least one embodiment of the invention also provides a method for protecting a withdrawable insert frame against unauthorized insertion of a withdrawable circuit breaker by the provision of a closure apparatus as above in the withdrawable insert frame and detachable blocking of the movement device of the closure apparatus such that the plates of the plate arrangement cannot move to the open state, in which, for blocking, two pivoting elements, which engage in one another in the blocking state and thus block the movement device, are in each case pivoted about an axis parallel to the plates.

A method is likewise provided for insertion of a circuit breaker into a withdrawable insert frame by the provision of a closure apparatus as mentioned above in the withdrawable insert frame and detachment of blocking of the movement device of the closure apparatus, such that the plates of the plate arrangement can move to the open state, with the blocking being released by releasing an engagement of two pivoting elements which are fitted to the movement device, by the pivoting elements being pivoted about an axis parallel to the plates.

The movement device can be closed or locked in the closed position. This may be done, for example, via a padlock. The movement device can thus be unlocked only deliberately or by authorized personnel, so that the withdrawable circuit breaker can be inserted into the withdrawable insert system only in these cases.

The movement device preferably has at least one V-shaped linkage whose two limbs are mounted in a joint such that they can rotate, whose first limb is fixed by its free end on the first or second plate, and whose second limb is fixed by its free end on the stationary section of the closure apparatus.

This V-shaped linkage controls the movement of the shutter plates. In particular a movement step-up ratio can be provided by a movement of the connected ends of the limbs of the V-shaped linkage with respect to the movement, at right angles to this, of the free ends of the V-shaped linkage.

A variable-length rod device, for example a telescopic rod, is advantageously fixed by one of its ends to the joint of the V-shaped linkage, and is fixed by its other end directly or indirectly to a section of the closure apparatus which cannot move. The blocking mechanism can be provided easily by blocking the length variation of the rod device. The V-shaped linkage thus cannot move, so that the plates can no longer be moved to the open position.

In one example refinement, the plate arrangement includes three parallel plates, one of which is fixed in position with respect to the closure apparatus and is used as a mask, and the other two plates can move. In this case, the displacement movement of each of the movable plates can be essentially designed such that it corresponds to half the extent of the at least one opening in the movement direction. If each of the movable plates is in this case coupled by in each case one V-shaped linkage to the fixed-position plate or mask, and the joints of the two V-shaped linkages are coupled to the rod device, the closure apparatus can be opened by a small movement of the rod device at right angles to the plates.

The movement device may have a greater extent at right angles to the plates in its blocked state than in its unblocked state. In consequence, a withdrawable circuit breaker cannot be inserted into a nominal insertion position when the withdrawable insert system is in the blocked state, in which nominal insertion position a withdrawable insert mechanism carries out the insertion process automatically.

Furthermore, the rod device may have two pivoting elements which can each pivot about an axis parallel to the plates, which engage in one another in a blocking state, and thus block the length variation of the rod device. These pivoting elements not only allow the blockade to be achieved but also the physical depth of the shutter or of the closure apparatus to be enlarged, preventing the insertion of the circuit breaker, as just described.

The closure apparatus according to at least one embodiment of the invention may furthermore have a pushing device for moving the closure apparatus at right angles to the plates. As has likewise already been mentioned, this is used to move the closure apparatus in the direction of the rear wall of the withdrawable insert frame after the opening process. In this case, it is advantageous for the extent of the movement device at right angles to the plates to be greater than that of the displacement device, so that, during movement of the circuit breaker or of the withdrawable circuit breaker towards the closure apparatus, the plates are first of all moved apart from one another and are then moved together with the circuit breaker in the direction of the rear wall. One precondition for this movement procedure is that when the individual movements are carried out against corresponding restoring springs, the opening force to open the shutter is less than the force to move the shutter to the rear wall of the built-in frame.

BRIEF DESCRIPTION OF THE DRAWINGS

Embodiments of the present invention will now be explained in more detail with reference to the attached drawings, in which.

The example embodiments which will be described in more detail in the following text represent example embodiments of the present invention.

DETAILED DESCRIPTION OF THE EXAMPLE EMBODIMENTS

Figure 1:
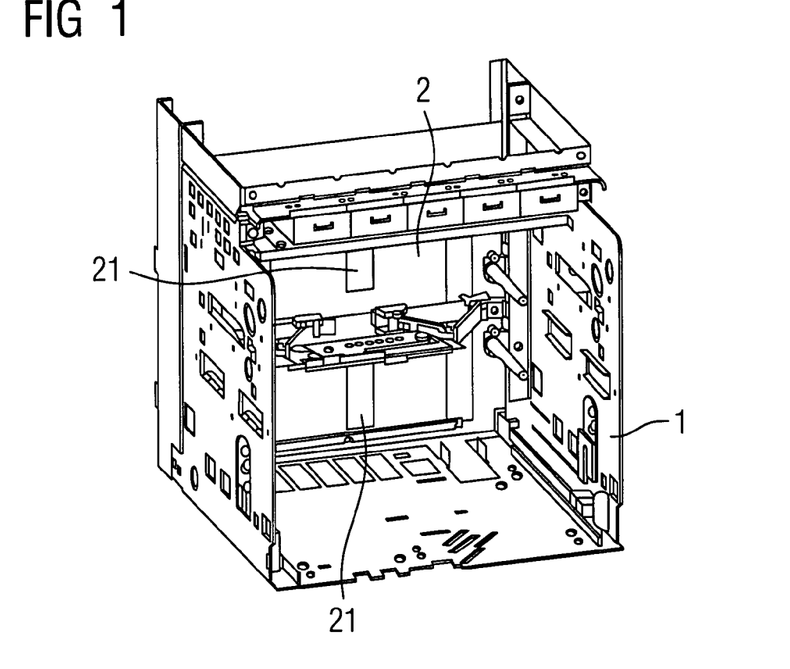
FIG. 1 shows a perspective view of a withdrawable insert frame according to at least one embodiment of the invention with an unlocked shutter.

A withdrawable insert frame 1 according to at least one embodiment of the invention has a shutter 2 on its rear face, as shown in FIG. 1. A circuit breaker, which is not illustrated, is inserted into the withdrawable insert frame 1 from the front, and then opens the openings 21 of the shutter 2 during the insertion process, so that the laminate blocks of the disconnection contact system on the withdrawable circuit breaker can make contact with the contact blades in the withdrawable insert frame.

Figure 2:
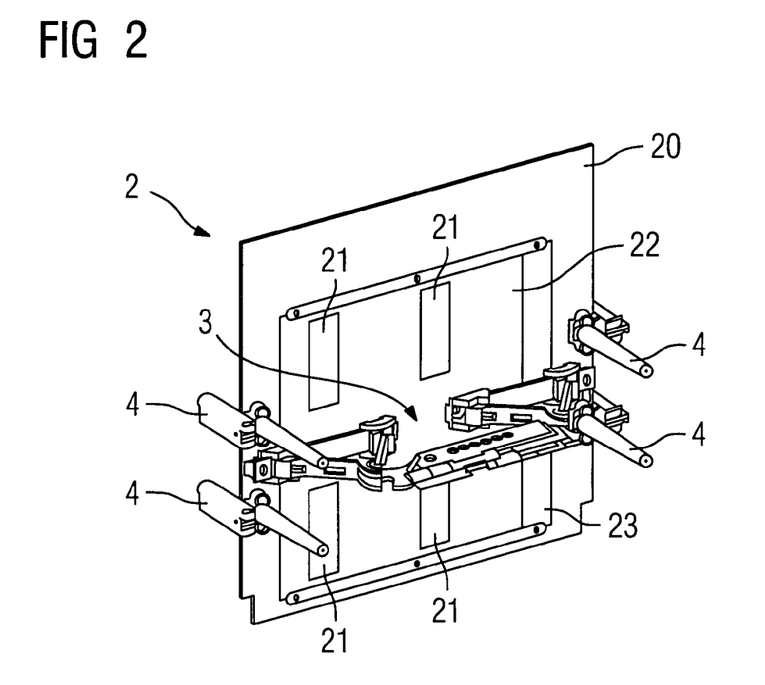
FIG. 2 shows a perspective view of a shutter according to at least one embodiment of the invention.

FIG. 2 shows the shutter or the closure apparatus according to at least one embodiment of the present invention in the removed state. The shutter 2 essentially includes a mask 20 to which two shutter plates 22 and 23 are fitted, parallel, and each have openings 21. The shutter plates 22 and 23 can be moved parallel relative to the mask 20 (see FIGS. 5 and 6). The plates 20, 22, 23 are each composed of an insulating material. The plate of the mask 20 is furthermore designed to be somewhat thicker than the shutter plates 22 and 23. The movement of the shutter plates is carried out by way of an opening mechanism 3. The overall movement of the shutter 2 in the direction of the rear face of the built-in frame 1 is made possible by guide elements 4.

Figure 3:
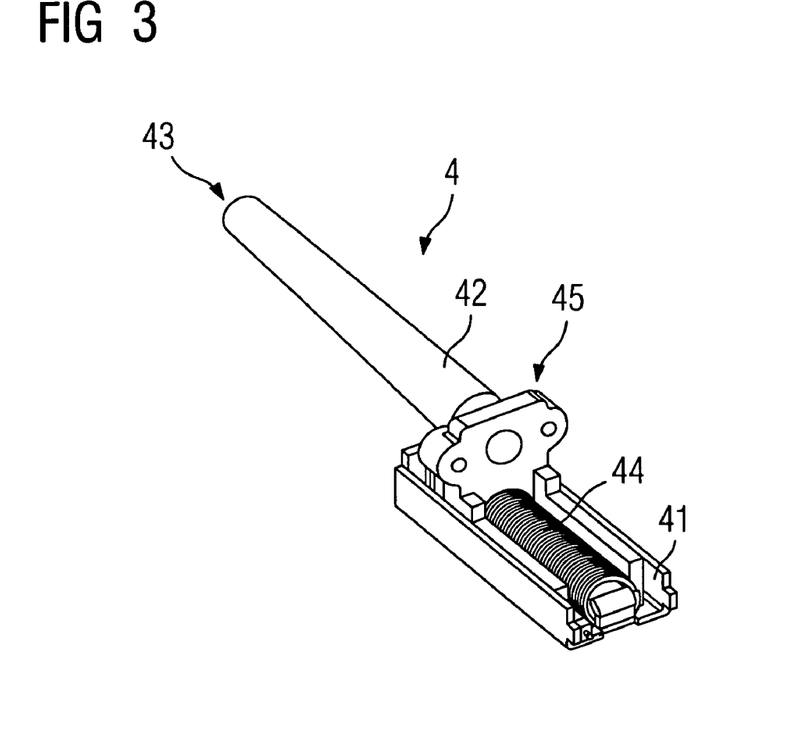
FIG. 3 shows a perspective view of a guide element for movement of the shutter to the rear wall of the built-in frame.

FIG. 3 shows a perspective view of a guide element such as this, in detail. A sheet-metal part 41 is used for mounting in the withdrawable insert frame 1. During insertion of the circuit breaker, a part 42 in the form of a pin is operated at its end face 43 by the circuit breaker. A compression spring 44 acts against this movement. The mask 20 of the shutter 2 is screwed to a mounting plate 45. The movement of the pin 42 thus moves the entire shutter 2 in the withdrawable insert frame 1 against the spring force of the compression spring 44 along the axis of the pin 42. The contact between the circuit breaker housing and the pin 42, and thus also the movement of the entire shutter 2, take place only from a circuit breaker insertion position in which the lateral movement of the shutter is complete.

Figure 4:
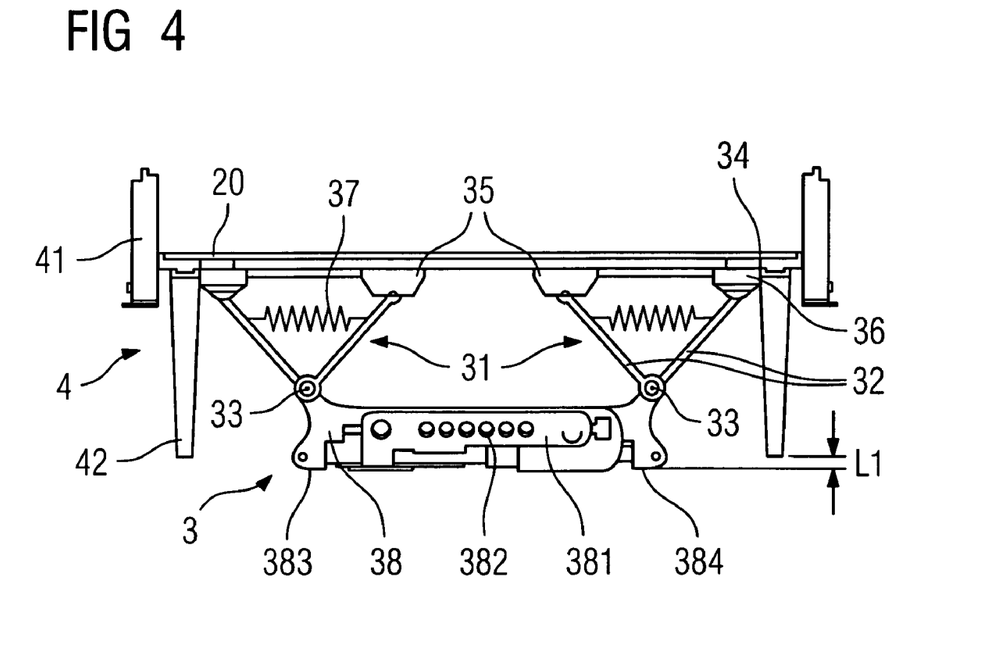
FIG. 4 shows a plan view of the shutter shown in FIG. 2, from above.

The shutter 2 is opened by use of the opening mechanism 3, a plan view of which is illustrated in FIG. 4 (in the present document, this is also referred to as the movement device).

Figure 7:
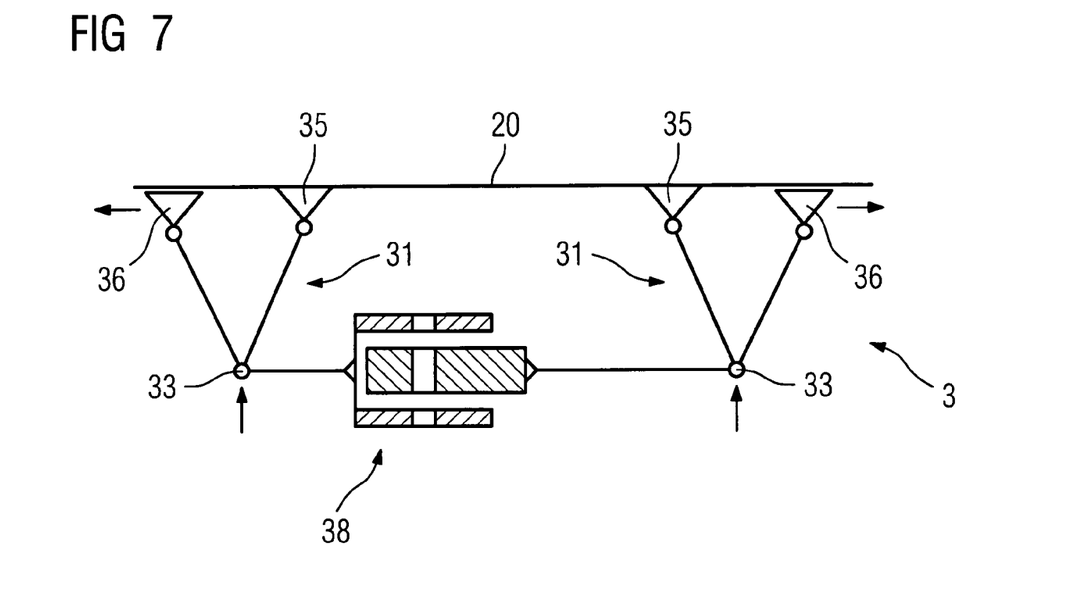
FIG. 7 shows an outline sketch of the opening mechanism for the shutter in its closed state.
Figure 8:
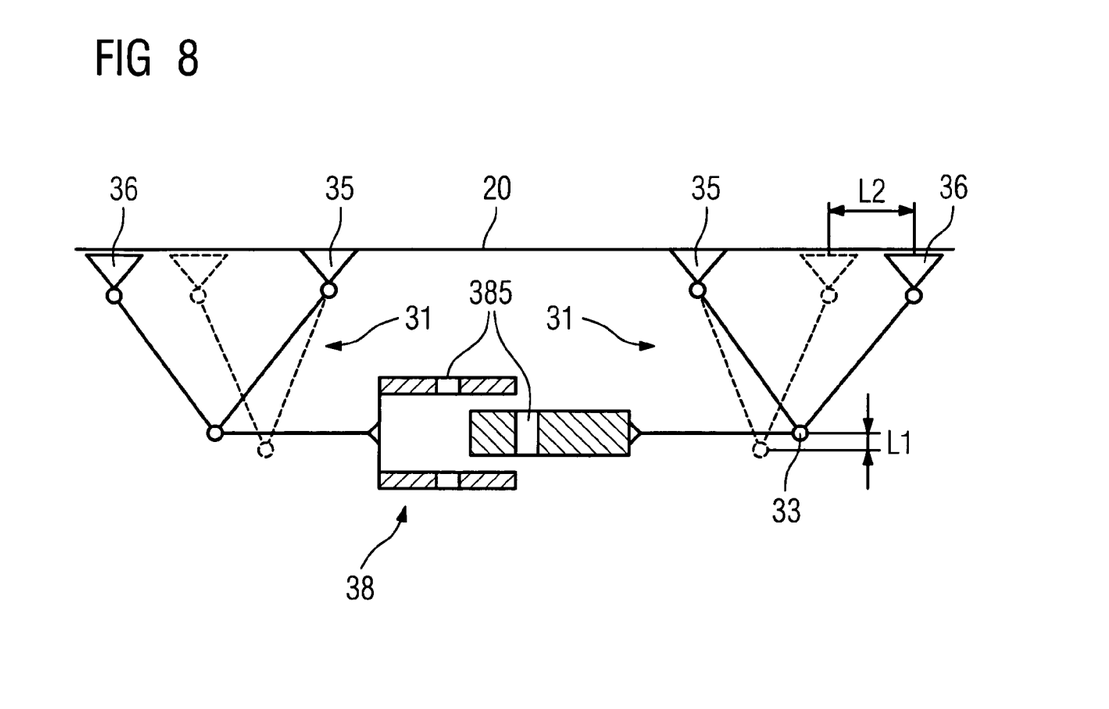
FIG. 8 shows the opening mechanism with the shutter open.
Figure 9:
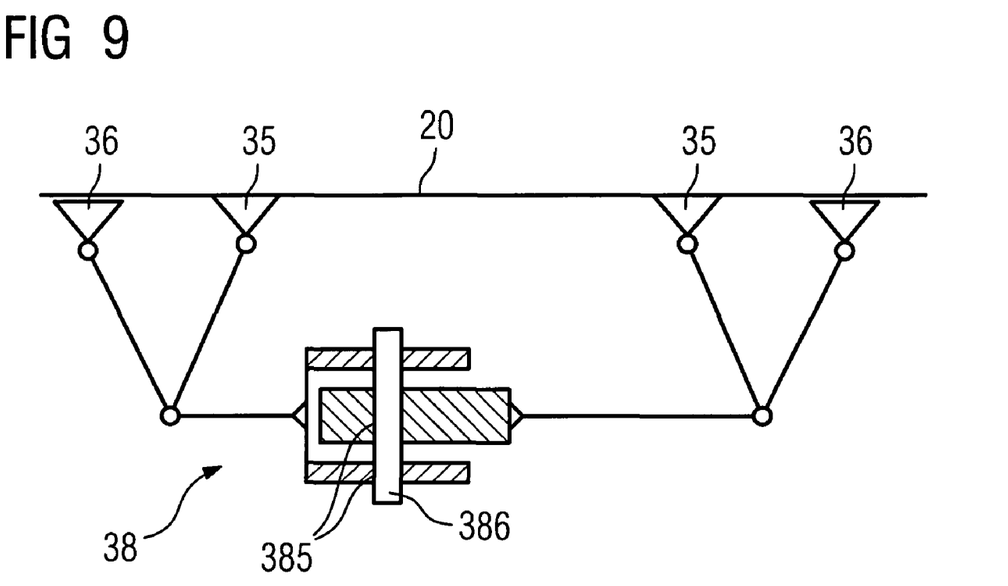
FIG. 9 shows the shutter in the locked state.

Two V-shaped linkages, each having two push rods 32 which are connected to one another in a joint 33, are each connected at their free ends to the mask 20 or via a driver 34 to one of the two shutter plates (the shutter plates cannot be seen in the illustration in FIG. 4; see also FIGS. 7 to 9). The linkages 31 are, however, each mounted on the mask 20 at a joint 35 such that they can rotate but are in a fixed position. They are mounted on the respective shutter plate via a slide 36, on which the corresponding push rod 32 is mounted, likewise such that it can rotate. The slides 36 can be moved sideways and during this sideways movement operate the moving shutter plates by way of the drivers 34.

Tension springs 37 are provided between the push rods 32 in each linkage 31. These tension springs 37 move an opened shutter back to the closed position when the circuit breaker is moved out. The V-shaped linkages 31 are connected at their joints 33 by way of a telescopic rod 38, whose length is variable, and which is likewise mounted at the joints 33 such that it can rotate. Both on its upper face and on its lower face, it in each case has a pivoting element 381, which can be pivoted forwards about an axis that is arranged parallel to the telescopic rod 38, in order to open the withdrawable insert frame. In the pivoted-out state, the pivoting elements 381 increase the insertion depth of the opening mechanism (see FIG. 11). Furthermore, the two pivoting elements 381 engage in one another in their pivoted-out state, in such a way that the length of the telescopic rod 38 is fixed. The entire opening mechanism 3 is thus blocked. The pivoting elements 381 also have holes 382, so that they can be locked to one another in the pivoted-out state by way of a padlock (likewise see FIG. 11).

During insertion of the circuit breaker, it touches the telescopic rod 38 at correspondingly shaped touching points 383 and 384. In this case, the entire telescopic rod 38 is moved parallel towards the shutter plates. When the shutter is in the closed state, the touching points 383 and 384 are located at the distance L1 (for example 8 mm) in front of the end surfaces 43 of the guide elements 4 for the movement towards the rear. This ensures that the opening movement of the shutters is complete before the shutter is moved to the rear during insertion of the circuit breaker. In this case, the spring force of the compression springs 37 in the opening mechanism 3 is designed such that the telescopic rod 38 can be pushed in the direction of the shutter plates more easily then the entire shutter can be pushed against the compression springs 44 of the guide elements 4 for the movement towards the rear.

Figure 5:
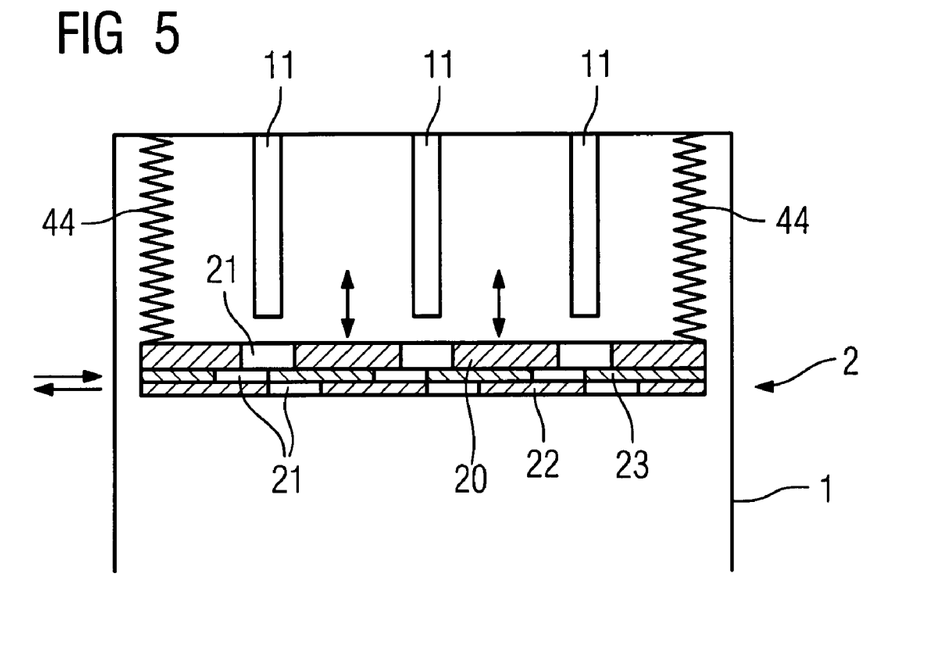
FIG. 5 shows an outline sketch of a closed shutter.

The method of operation of the shutter according to at least one embodiment of the invention will now be explained in more detail with reference to FIGS. 5 to 11. First of all, the movement of the shutter plates and of the mask will be described in detail with reference to FIGS. 5 and 6. The sketch in FIG. 5 shows a shutter 2 in the closed state in the built-in frame 1. Contact blades 11 project forwards from the rear wall of the built-in frame 1, in the direction of its opening. The shutter 2 is supported by the compression springs 44 of the guide elements on the built-in frame 1. This essentially includes the three plates: mask 20, shutter plate 22 and shutter plate 23.

As mentioned, the mask plate is somewhat thicker than the two other plates 22 and 23. The latter can be moved laterally in the two directions indicated by arrows. The openings 21 in the mask plate 20 are aligned with the contact blades 11. When the shutter is in the closed state, the shutter plate 23 is moved through half the opening width to the left with respect to the mask plate 20. With a typical opening width of 35 mm, the corresponding offset of the shutter plate 23 would be 17.5 mm.

Figure 6:
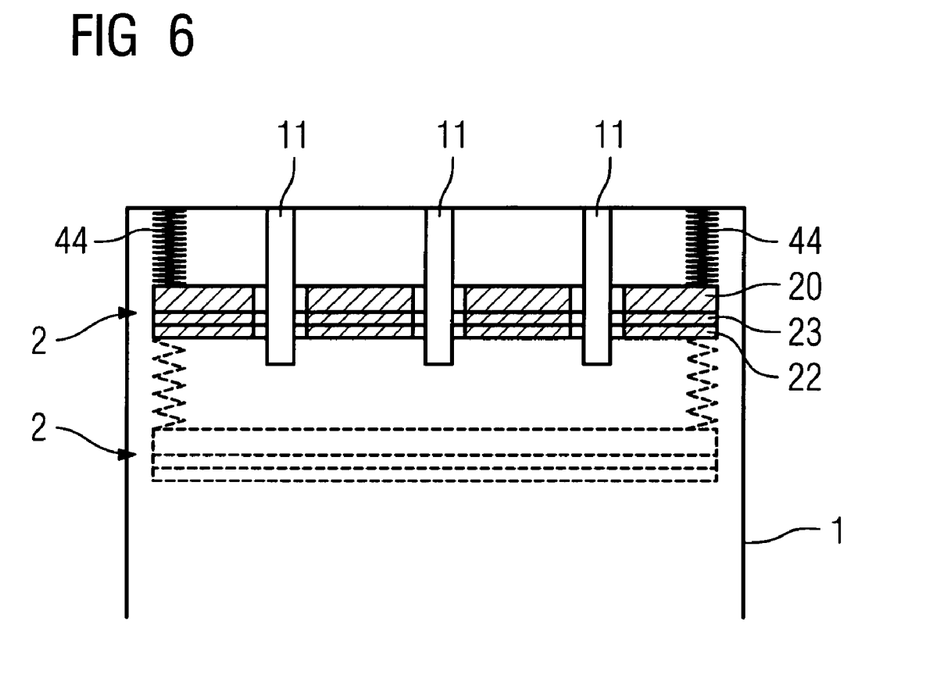
FIG. 6 shows an outline sketch of an open shutter.

In contrast, the shutter plate 22 is moved through half the opening width to the right with respect to the mask 20. The two shutter plates 22 and 23 are thus moved through the complete opening width with respect to one another, so that the openings 21 in the mask are completely covered. During insertion of the circuit breaker, the shutter plate 22 is moved through half the opening width to the left, and the shutter plate 23 is moved through half the opening width to the right. All of the openings 21 in the plates of the shutter 2 are thus coincident, and can be pushed over the contact blades 11 of the built-in frame 1 as shown in FIG. 6, as is likewise indicated by arrows pointing upwards and downwards in FIG. 5. The position of the shutter 2 before being pushed over the contact blades 11 is indicated by dashed lines in FIG. 6.

FIG. 7 shows a sketch of the basic operation of the movement device for opening of the shutter, corresponding to FIG. 4. Those elements which are in each case identified by the same reference symbols in FIG. 7 also correspond to those in the previous figures, as FIGS. 5 and 6 as well. FIG. 7 shows the shutter in a closed state. During opening, the joints 33 of the linkages 31 are moved to the rear (see the arrows), that is to say towards the mask 20. The slides 36 are moved in a corresponding manner outwards.

The movement device or the opening mechanism 3 finally reaches the open state, as shown in FIG. 8, in which the openings 21 in the plates of the shutter 2 (see FIG. 6) are located one behind the other. In this position, the joints 33 have been moved through the distance L1 to the rear. As a result of the movement step-up ratio of the V-shaped linkage arrangement, the slides 36 have been moved laterally in this position through the distance L2, which is considerably greater than L1. L1 is typically 8 mm, and L2 about 17.5 mm. The closed position of the linkages 31 is indicated by dashed lines in FIG. 8. As can also be seen from FIG. 8, the telescopic rod 38 is lengthened or extended in the open state of the shutter, in comparison to the closed state. The holes 385 in the telescopic elements are not coaxial, in contrast to the closed state of the shutter.

Finally, FIG. 9 shows the opening mechanism 3 as in FIG. 7, in a closed state, in which the holes 385 in the telescopic rod are aligned with one another. The telescopic rod 38 is constrained in its extension movement by a blocking or locking element 386. This blocking element 386 can be provided by the two pivoting elements 381 as shown in FIG. 4 or, for example by use of a padlock (see FIG. 11). In each case, this locking element 386 prevents the extension movement of the telescopic rod 38, and thus any movement of the entire opening mechanism from the closed state to the open state.

Figure 10:
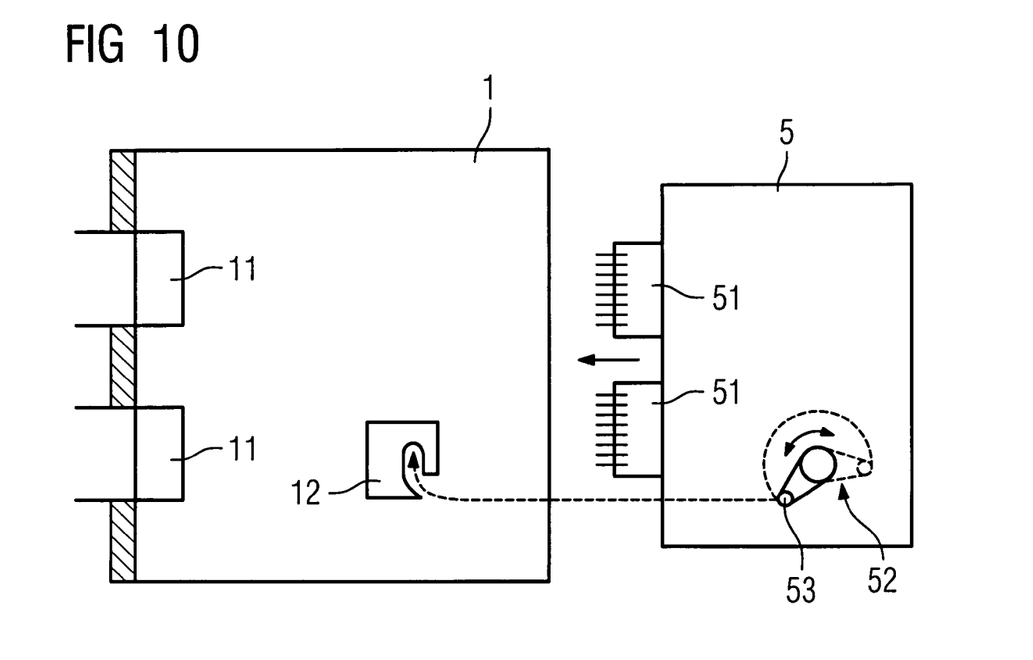
FIG. 10 shows an outline sketch for insertion of a circuit breaker into the withdrawable insert frame.

FIG. 10 shows the mechanism by which a circuit breaker 5 is inserted into a built-in frame 1. The contact blades 11 are indicated in the withdrawable insert frame, and the corresponding contact terminals 51 are indicated on the circuit breaker 5. In order to control the insertion movement, the circuit breaker 5 has a rotating lever mechanism 52. During the insertion process, a bolt 53 of the rotating lever mechanism 52 is screwed into a slotted link 12 in the withdrawable insert frame, such that the movement of the circuit breaker 5 into the withdrawable insert frame 1 can be carried out with sufficiently precise alignment. For the sake of clarity, the shutter 2 is not illustrated in FIG. 10.

Figure 11:
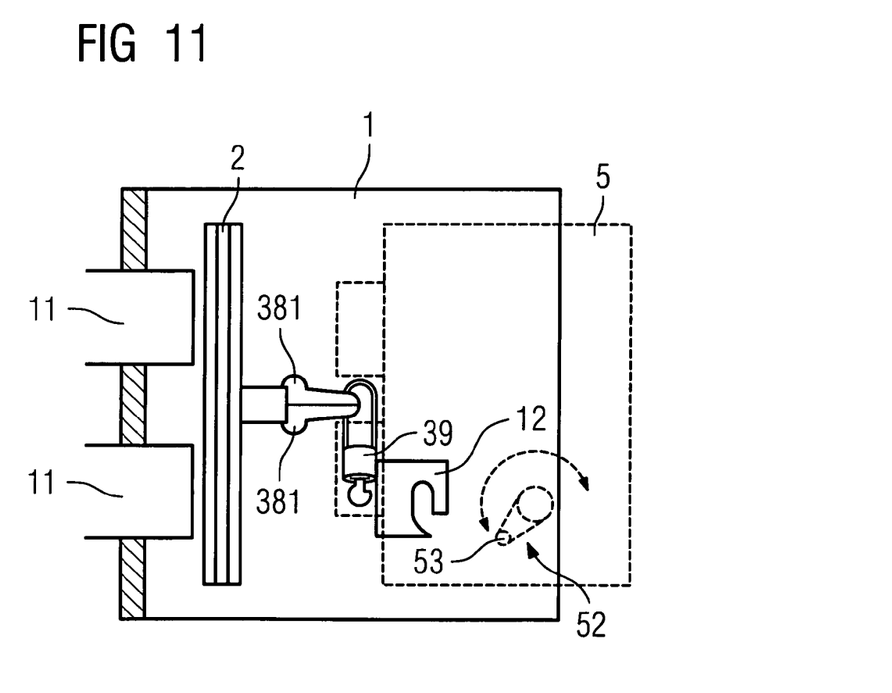
FIG. 11 shows a sketch of a circuit breaker which has been inserted into a locked withdrawable insert frame.

FIG. 11 shows, schematically, the state in which the circuit breaker 5 (represented by dashed lines) has been inserted into the withdrawable insert frame 1, but the shutter 2 is locked by a padlock 39. As can clearly be seen from the illustration, the pivoting elements 381 on the shutter 2 are pivoted forwards, that is to say towards the insertion opening in the withdrawable insert frame 1, thus increasing the physical height of the shutter in this direction. It is thus not possible for the circuit breaker 5 to be moved to a nominal insertion position in which the bolt 53 engages in the slotted link 12. In consequence, the circuit breaker 5 cannot be pushed into the built-in frame 1.

In order to unlock the telescopic rod 38, the pivoting elements 381 are pivoted in the direction of the shutter 2, and are held in this position by a snap-action hook (not illustrated).

The entire mechanism of the closure apparatus according to at least one embodiment of the invention can advantageously be manufactured from simple plastic parts. Since the shutter can thus be manufactured completely from insulating parts, the risk of flashovers during installation and operation of the circuit breakers can be reduced. Furthermore, except for width-dependent insulating material parts, essentially the same individual parts can be used for all shutter sizes. In one advantageous refinement of the pivoting elements 381, which have a locking function, a plurality of retaining holes 382 (see FIG. 4) are also provided for padlocks, so that only appropriately authorized personnel can unlock the shutter mechanism.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A closure apparatus for withdrawable insert frames for a withdrawable circuit breaker, comprising:
    a plate arrangement, including at least two plates arranged in parallel and movable with respect to one another, each including at least one opening, the at least one opening in a first plate of the at least two plates being covered, in a closed state, by a second of the at least two plates, and the at least one opening in each of the two plates being located one above the other in an open state; and
    a movement device for movement of the at least two plates relative to one another, the movement device being blockable such that the plates of the plate arrangement cannot be moved to the open state, and the movement device including pivoting elements, each pivotable about an axis parallel to the plates, to engage in one another in a blocking state, and thus block the movement device.

2. The closure apparatus as claimed in claim 1, wherein the movement device includes a V-shaped linkage, whose two limbs are mounted in a joint and rotatable, a first limb being fixed by its free end on the first or second plate and a second limb being fixed by its free end on a section of the closure apparatus which cannot move in a direction parallel to the plates.

3. The closure apparatus as claimed in claim 2, wherein a variable-length rod device is fixed by one of its ends to the joint of the V-shaped linkage, and is fixed by its other end directly or indirectly to a section of the closure apparatus which cannot move in a direction parallel to the plates.

4. The closure apparatus as claimed in claim 3, wherein the length variation of the rod device is blockable.

5. The closure apparatus as claimed in claim 2, wherein the movement device, includes a greater extent at right angles to the plates in its blocked state than in its unblocked state.

6. The closure apparatus as claimed in claim 2, further comprising a displacement device for movement of the closure apparatus at right angles to the plates.

7. The closure apparatus as claimed in claim 2, further including a tension spring between the two limbs of the V-shaped linkage.

8. The closure apparatus as claimed in claim 1, wherein the plate arrangement includes three parallel plates, one of the plates being fixed in position with respect to the closure apparatus in a direction parallel to the plates and used as an mask, and the two other plates being movable.

9. The closure apparatus as claimed in claim 8, wherein the displacement movement of each of the movable plates corresponds essentially to half the extent of the at least one opening in the movement direction.

10. The closure apparatus as claimed in claim 9, wherein each of the movable plates is coupled by in each case one V-shaped linkage to the fixed-position plate, and the joints of the two V-shaped linkages are coupled to the rod device.

11. The closure apparatus as claimed in claim 8, wherein each of the movable plates is coupled by in each case one V-shaped linkage to the fixed-position plate, and the joints of the two V-shaped linkages are coupled to the rod device.

12. The closure apparatus as claimed in claim 1, wherein the movement device includes a greater extent at right angles to the plates in its blocked state than in its unblocked state.

13. The closure apparatus as claimed in claim 1, further comprising a displacement device for movement of the closure apparatus at right angles to the plates.

14. The closure apparatus as claimed in claim 1, wherein the pivoting elements include at least one hole that align over one another when the pivoting elements overlap one another.

15. The closure apparatus as claimed in claim 1, wherein each of the at least two plates are laterally movable.

16. A method for protecting a withdrawable insert frame against unauthorized insertion of a withdrawable circuit breaker, the method comprising:
    provisioning a closure apparatus including a movement device and a plate arrangement of at least two plates arranged in parallel and movable with respect to one another in the withdrawable insert frame each including at least one opening, the at least one opening in a first plate of the at least two plates being covered, in a closed state, by a second of the at least two plates, and the at least one opening in each of the two plates being located one above the other in an open state; and
    detachably blocking a movement device of the closure apparatus such that the plates of the plate arrangement cannot move to an open state, the blocking of the movement device being achieved by engaging two pivoting elements with one another, the pivoting elements in each case being pivoted about an axis parallel to the plates.

17. The method as claimed in claim 16, wherein the movement of the withdrawable circuit breaker is limited to the closure apparatus by use of the pivoting elements.

18. A method for insertion of a withdrawable circuit breaker into a withdrawable frame, comprising:
    provisioning a closure apparatus including a movement device and a plate arrangement of at least two plates arranged in parallel and movable with respect to one another in the withdrawable insert frame each including at least one opening, the at least one opening in a first plate of the at least two plates being covered, in a closed state, by a second of the at least two plates, and the at least one opening in each of the two plates being located one above the other in an open state; and releasing blocking of the movement device of the closure apparatus such that the plates of the plate arrangement can move to the open state, the blocking being released by releasing the engagement of two pivoting elements which are fitted to the movement device, by pivoting the pivoting elements about an axis parallel to the plates.

19. The method as claimed in claim 18, wherein the plates are moved to the open state and then moved further at right angles to this movement, corresponding to the movement of the withdrawable circuit breaker, during insertion of the withdrawable circuit breaker into the withdrawable insert frame.

* * * * *